Oct. 7, 1941.  S. L. CHRISTIE  2,258,045
ELECTRODE STRUCTURE FOR CONDUCTIVITY TESTING
Original Filed March 2, 1938

INVENTOR
SOREN L. CHRISTIE
BY HARRIS, KIECH, FOSTER & HARRIS
*Clarence F. Kiech*
FOR THE FIRM
ATTORNEYS.

Patented Oct. 7, 1941

2,258,045

UNITED STATES PATENT OFFICE 2,258,045

ELECTRODE STRUCTURE FOR CONDUCTIVITY TESTING

Soren L. Christie, Los Angeles, Calif.

Original application March 2, 1938, Serial No. 193,484. Divided and this application July 5, 1940, Serial No. 344,118

3 Claims. (Cl. 175—183)

This invention relates to apparatus and methods for determining or indicating the properties of materials, and, more particularly, relates to the determination or indication of electric impedance and associated properties such as electric resistance, conductivity, and the like.

It is an object of the present invention to provide an improved electrode structure adapted to the testing of liquids to determine their impedance, conductivity, and associated properties, such as salt concentration, or to indicate the presence of conducting impurities and the like.

An important feature of the invention is the provision of an electrode structure comprising spaced electrodes adapted to be electrically bridged by the fluid which it is desired to test, said structure being characterized by having a current-carrying zone substantially free from obstructions, such as spacing elements and the like, thereby avoiding errors due to stray surface conduction.

Further objects and aspects of the invention will be apparent hereinafter.

Referring to the drawing.

Figure 1:
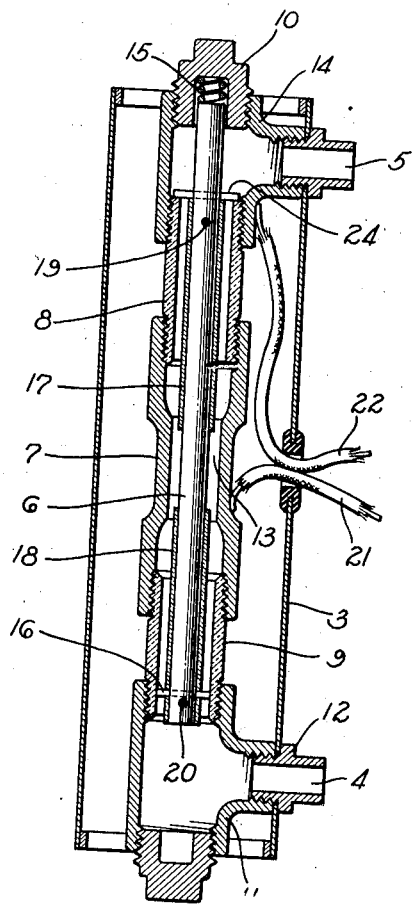
Fig. 1 shows a conductivity cell embodying elements of my invention.

Fig. 1 is a cross section of a conductivity cell which embodies certain elements of my invention. This conductivity cell is particularly suitable to continuous use on flowing streams of fluid. It is provided with an inlet member 4 and an outlet member 5, whereby the water or other fluid may be continuously passed or circulated through the cell. The cell is provided with an inner cylindrical electrode 6 and an outer sleeve electrode 7, and the fluid whose conductivity is to be measured is passed through the intervening annular space 13 which constitutes the main current path.

At the bottom of housing 3, a side entrance is provided through which the inlet member 4 is inserted. A T 11 receives the inlet member 4 in its threaded branch connection and, by means of a shoulder 12 carried by the inlet member 4, the T 11 and inlet member may be firmly fixed to the housing 3. The bottom of the T 11 is closed with a plug which may be removed for cleaning or draining purposes. The upper branch of the T 11 carries an insulating nipple 9, on which is fixed the sleeve electrode 7.

The upper end of the sleeve electrode 7 is joined to an insulating nipple 8 which is connected to an upper T 14 secured to the housing 3 in the same way as the T 11. The other branches of the T 14 receive an upper plug 10 and outlet 5, respectively.

The plug 10 provides a recess into which the upper end of the cylindrical electrode 6 extends, and is electrically connected with the electrode 6 by means of a spring 15. The recess in the plug 10 serves to center properly the upper end of the electrode 6. A pin 24, abutting on the end of the nipple 8 takes up the pressure of the spring 15. The lower end of the electrode 6 is centered or spaced by means of pins 16 and 20 which may be of either conducting or insulating material, the ends of which contact the insulating nipple 9. The pins 16, 20, and 24 pass through the member 6 and are firmly fixed therein. The electrode 6 is insulated over the greater part of its length other than that immediately adjacent the sleeve electrode 7 by insulating sheaths 17 and 18, which serve to largely restrict the current path to an annulus 13. By these means, the electrolytic conduction is restricted to a region free from spacing elements or other surfaces liable to fouling or contamination and, hence, the danger of current leakage on salt-encrusted or otherwise conducting surfaces is eliminated. A hole 19 in the cylindrical electrode 6 may be used to secure the upper insulating sheath in position by means of a suitable pin.

The electrode 7 is connectable to a conductivity measuring instrument by means of wire 21. The electrode 6 is connected by means of the spring 15, plug 10, and T 14 to the wire 22 which may constitute the second lead to the measuring instrument. The insulated wires 21 and 22 may be connected to any instrument or circuit responsive to the resistance or conductivity of the conductivity cell. For example, a constant voltage may be impressed across leads 21 and 22 and the resulting current measured, or a known current may be passed through the leads and the voltage drop measured, etc.

Figure 2:
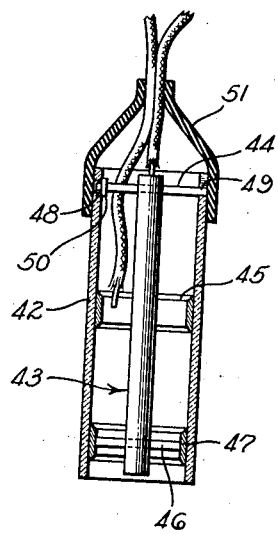
Fig. 2 is an illustration of another conductivity cell.

Fig. 2 illustrates in partial cross section another form of conductivity cell particularly adapted to test samples, and which may be used by simply immersing the cell in the water to be tested. The housing 42 is a cylindrical nonconducting shell. An inner cylindrical electrode 43 is suspended from a cross pin 44. The second electrode 45 is formed as a ring of conducting material and is firmly secured to the inner wall of the insulating housing 42. The cylindrical electrode is axially centered by the joint action of the cross pin 44 and a lower cross pin 46, both pins being firmly secured in the electrode. The pin 46 acts to center the bottom portion of the electrode 43 by the contact of the ends of the pin with spacing ring 47, the latter being fixed to the housing. The upper cross pin 44 is accurately oriented by having one end inserted in a hole 48 in the housing 42, and the other end resting in a slot 49 in the housing 42, and its position is further fixed by a shoulder 50 which abuts against the inner wall of the housing. The pin 44 is constrained to retain its position by the compressive force of rubber cap 51 which acts on a prolonged portion of the pin 44 extending somewhat outside the slot 49. The inner electrode assembly may be readily removed for cleaning by removing the rubber cap, withdrawing the pin 44 from the hole 48, and lifting the inner electrode assembly from the housing. By inserting a suitable brush, the annular electrode in either construction shown in Figs. 1 and 2 can be conveniently cleaned after removal of the inner cylindrical electrode member.

The conductivity cells illustrated in Figs. 1 and 2 are particularly characterized by having a current-carrying zone free from any obstruction, such as spacing elements and the like. The absence of any such surfaces, which frequently tend to absorb salt or otherwise become conductive, is of particular value when testing liquids of very low conductivity where any surface conduction would induce large errors. These cells are further characterized by their electrode configuration comprising a cylindrical sleeve electrode of relatively short length, an inner coaxial cylindrical electrode extending substantially beyond the ends of the sleeve electrode, and spacing elements substantially removed from the annular zone of conduction between the two electrodes.

The conductivity cell shown in Fig. 2 is particularly adapted for the testing of isolated samples and need only be immersed in the liquid in order to be operative.

The conductivity cell shown in Fig. 1 is particularly adapted for measuring the conductivity of a continuously flowing stream or of a diverted test stream which may be either returned to the main body of the stream or to waste after passing through the cell. A continuous stream of liquid is thus passed through the cell at all times, entering the cell at inlet 4 and issuing from the cell at exit 5. Both of these connections may be grounded due to the fact that they are electrically connected only to one electrode, namely, the inner electrode. This feature is of particular advantage in that ordinary metallic pipe connections may be used for conducting the entering and leaving streams.

A feature of my construction is that it may also be used with the electrode member 6 completely removed, in which case the T's 11 and 14 form together one electrode, the sleeving 7 constituting as before the opposite electrode. This is particularly advantageous when the cell is used with liquids of relatively high conductivity.

It should be understood that the invention is not intended to be limited to the details of construction disclosed in the forms described for the reason that various other arrangements of the parts shown or of equivalent parts might be made, and various modifications of the forms described might be described, all coming within the scope of the invention, which should be interpreted only by the appended claims.

This application is a divisional of my co-pending application Serial No. 193,484, filed March 2, 1938, entitled "Conductivity indicating system and method."

I claim as my invention:

1. A conductivity testing device for fluids, including in combination: means defining a substantially unobstructed annular zone containing the fluid to be tested, said means comprising inner and outer electrodes having conducting surfaces spaced from each other and bridged by said fluid, said surfaces being in contact with the fluid to be tested; a support for the outer electrode comprising a tubular insulating means extending longitudinally beyond said annular zone and defining a fluid passageway in communication with said zone; and spacer means for spacing said inner and outer electrodes from each other, said spacer means being arranged in non-sealing relationship to said passageway and being disposed a substantial distance longitudinally beyond said annular zone so as to be removed from the main current-carrying region.

2. A combination as defined in claim 1, in which the support for the outer electrode comprises tubular insulating members extending longitudinally from the annular zone in both directions to define two passageways thereto, and including means to continuously supply the fluid to be tested to one of said passageways and to continuously withdraw fluid from the other of said passageways, whereby a continuous stream of fluid may be passed through said annular zone.

3. A combination as defined in claim 1, in which said spacer means comprises a support disposed to be immersed in said fluid during normal operation of said conductivity testing device.

SOREN L. CHRISTIE.